United States Patent
Háckel et al.

(10) Patent No.: US 12,420,521 B2
(45) Date of Patent: Sep. 23, 2025

(54) HYDROGEN TUBE

(71) Applicant: TI Automotive (Fuldabrück) GmbH, Fuldabrück (DE)

(72) Inventors: André Háckel, Waldeck (DE); Frank Fahrenholz, Kassel (DE); Martin Schramowski, Kassel (DE); Siegfried Arnold, Kassel (DE)

(73) Assignee: TI Automotive (Fuldabrück) GmbH, Fuldabrück (DE)

( * ) Notice: Subject to any disclaimer, the term of this patent is extended or adjusted under 35 U.S.C. 154(b) by 290 days.

(21) Appl. No.: 18/071,747

(22) Filed: Nov. 30, 2022

(65) Prior Publication Data

US 2023/0166477 A1 Jun. 1, 2023

(30) Foreign Application Priority Data

Nov. 30, 2021 (DE) .......................... 202021106514.1

(51) Int. Cl.
*B32B 1/08* (2006.01)
*B32B 7/12* (2006.01)
*B32B 27/08* (2006.01)
*B32B 27/18* (2006.01)
*B32B 27/30* (2006.01)
(Continued)

(52) U.S. Cl.
CPC .................. *B32B 1/08* (2013.01); *B32B 7/12* (2013.01); *B32B 27/08* (2013.01); *B32B 27/18* (2013.01); *B32B 27/306* (2013.01); *B32B 27/322* (2013.01); *B32B 27/34* (2013.01); *B32B 2250/05* (2013.01); *B32B 2250/24* (2013.01); *B32B 2250/42* (2013.01); *B32B 2307/202* (2013.01); *B32B 2307/732* (2013.01)

(58) Field of Classification Search
CPC ............... F16L 11/04; F16L 11/00; F16L 1/00
See application file for complete search history.

(56) References Cited

U.S. PATENT DOCUMENTS

| | | | |
|---|---|---|---|
| 2003/0124288 A1* | 7/2003 | Merziger | ................ B32B 27/34 428/36.91 |
| 2003/0165699 A1* | 9/2003 | Lacroix | ................... B32B 27/34 428/474.9 |

(Continued)

FOREIGN PATENT DOCUMENTS

| | | | |
|---|---|---|---|
| CN | 1648507 A | | 8/2005 |
| CN | 201494751 U | * | 6/2010 |

(Continued)

OTHER PUBLICATIONS

German Search Report dated Jun. 28, 2022.

*Primary Examiner* — Kenneth Rinehart
*Assistant Examiner* — Haotian Lu
(74) *Attorney, Agent, or Firm* — Dickinson Wright PLLC

(57) ABSTRACT

A tube and use of a tube for guiding hydrogen, preferably in a vehicle. The tube encloses a lumen and comprises several layers, wherein the layers of the tube includes at least two barrier layers. An inner barrier layer comprises a first plastic, and an outer barrier layer comprises a second plastic. The barrier layers are separated from each other by a separating layer, and the tube has a supporting layer enclosed by the inner barrier layer. The first plastic is a vinyl alcohol plastic, and the second plastic is a vinyl alcohol plastic.

16 Claims, 3 Drawing Sheets

(51) Int. Cl.
*B32B 27/32* (2006.01)
*B32B 27/34* (2006.01)

(56) References Cited

U.S. PATENT DOCUMENTS

| | | | |
|---|---|---|---|
| 2004/0069361 A1* | 4/2004 | Cheng | F16L 9/123 |
| | | | 138/137 |
| 2005/0170122 A1* | 8/2005 | Fahrenholz | B32B 1/08 |
| | | | 428/36.91 |
| 2006/0011251 A1 | 1/2006 | Sato | |
| 2006/0124190 A1* | 6/2006 | Cheng | B32B 27/322 |
| | | | 138/137 |
| 2009/0252979 A1* | 10/2009 | Ferreiro | F16L 11/04 |
| | | | 428/474.7 |
| 2010/0035116 A1 | 2/2010 | Cheng | |
| 2013/0190723 A1* | 7/2013 | Bourgeois | A61M 39/08 |
| | | | 138/137 |
| 2018/0149312 A1 | 5/2018 | Criel et al. | |

FOREIGN PATENT DOCUMENTS

| | | | | |
|---|---|---|---|---|
| DE | 60108574 T2 | 6/2005 | | |
| EP | 1182345 A1 | 2/2002 | | |
| EP | 2177805 B1 | 5/2018 | | |
| JP | 2001209906 A | 8/2001 | | |
| JP | 2003194265 A | 7/2003 | | |
| JP | 2004-132549 A | 4/2004 | | |
| JP | 2005212481 A * | 8/2005 | | B29C 48/09 |
| JP | 2006-168358 A | 6/2006 | | |
| JP | 2010094837 A * | 4/2010 | | B32B 1/08 |
| WO | WO-2010141073 A1 * | 12/2010 | | B32B 1/08 |

\* cited by examiner

HYDROGEN TUBE

RELATED APPLICATIONS

The present disclosure claims priority to and the benefit of German Utility Model Application 202021106514.1, filed on Nov. 30, 2021, the entire contents of each of which are incorporated herein by reference.

FIELD

The present disclosure relates to the use of a tube or pipe for guiding hydrogen.

BACKGROUND

US 2004/0069361 A1 discloses a tube for guiding hydrogen. This tube comprises an outer barrier layer composed of ethylene-vinyl alcohol copolymer (EVOH, often also referred to as "EVAL"), which is enveloped by two bonding layers composed of polyurethane. The innermost layer has a fluoropolymer and in particular polyvinylidene difluoride (PVDF), ethylene-tetrafluoroethylene-hexafluoropropylene fluoro-terpolymer (EFEP) or ethylene-tetrafluoroethylene copolymer (ETFE), and simultaneously forms an inner barrier layer due to the good barrier effect. The outermost layer of this tube is formed by polybutylene terephthalate (PBT), abuts against an exterior side of the outer barrier layer, and thus constitutes a boundary layer.

A tube for guiding hydrogen is further disclosed in US 2010/0035116 A1. This tube has a barrier layer composed of EVOH, which is enclosed by a boundary layer composed of polyamide (PA). An outermost layer comprises a polyphthalamide (PPA), and rests directly on the boundary layer. The barrier layer composed of EVOH encloses a directly adjacent, ETFE-comprising layer, which on its part is bordered by an innermost layer composed of PA.

We have discovered a disadvantage to these known hydrogen tubes in that the permeability is still too high, so that too much hydrogen always diffuses through the tubes and is thereby lost, as conspicuous in particular when vehicles are parked for long periods of time.

BRIEF SUMMARY

An improved pipe or tube is provided, in particular by using a tube to guide hydrogen, in particular in a vehicle, wherein the tube encloses a lumen and comprises several layers, wherein the tube has at least two barrier layers, wherein an inner barrier layer of the at least two barrier layers comprises a first plastic, wherein an outer barrier layer of the at least two barrier layers comprises a second plastic, wherein the first plastic is a vinyl alcohol plastic, wherein the barrier layers are separated from each other by a separating layer, wherein the tube has a supporting layer, wherein the supporting layer is enclosed by the inner barrier layer, wherein the second plastic is a vinyl alcohol plastic.

The present disclosure is initially based upon the knowledge that the permeability of a barrier layer relative to hydrogen is slight during the use of a vinyl alcohol plastic. The permeability can basically be decisively reduced by larger layer thicknesses of the barrier layer. However, barrier layers with vinyl alcohol plastics are quite brittle, which is critical for the usually numerous times such a tube is to be bent. It was found that in a barrier layer with a layer thickness which is too large, this barrier layer forms microcracks significantly more frequently during the bending process. These microcracks lead to a considerably higher permeability, so that enlarging the layer thickness of the vinyl alcohol barrier layer constitutes only a very limited means for improving the barrier properties.

In particular, the present disclosure is based upon the discovery that providing a second barrier layer with a vinyl alcohol plastic while interspersing a separating layer between the two barrier layers enables a significantly larger overall layer thickness of barrier layers with a vinyl alcohol plastic, while the cracking probability remains consistently low. By providing two, three or more vinyl alcohol barrier layers with a corresponding number of interspersed separating layers, the overall layer thickness of the added layer thicknesses of the individual vinyl alcohol barrier layers can even be multiplied by comparison to a single vinyl alcohol barrier layer, while the cracking probability, and hence also the reject rate, stays at a constant low level. The object mentioned at the outset is thereby solved.

The term "layer" preferably means that one layer can be distinguished from another layer, because these two layers have different material compositions. A layer does not necessarily have to consist of a single, integral, or homogenously distributed material composition. It is possible that a layer have partial layers or plies, which on their part can be distinguished from each other. A single ply advantageously consists of a single, homogeneously distributed material composition.

The term "vinyl alcohol plastic" preferably refers to polymers with a vinyl alcohol monomer, and in particular to ethylene vinyl alcohol copolymer (EVOH), polyvinyl alcohol (PVOH) and butenediol vinyl alcohol copolymer (BVOH). It is possible that the vinyl alcohol plastic be the only plastic of the inner barrier layer and/or the outer barrier layer. In one embodiment, the inner barrier layer and/or the outer barrier layer comprises a mixture of the vinyl alcohol plastic with a second or with additional materials, and in particular with a plastic or additional plastics.

It is preferred that the tube be a plastic tube, and preferably consist of at least 50 or 70 or 90 or 95 or 97% w/w of plastics. It is preferable that a/the protective layer and/or the supporting layer and/or the inner barrier layer and/or the separating layer and/or the outer barrier layer and/or the boundary layer consist of at least 50 or 70 or 90 or 95% w/w of a plastic, in particular a thermoplastic. The tube expediently has at least one, preferably at least two or three or four or five bends. The tube expediently has an outer diameter of at least 2 mm or 3 mm or 4 mm.

It is preferable that the separating layer comprise a plastic, preferably a polyamide, and in particular PA 6. If the separating layer has a polyamide, the separating layer provides good tenacity, as a result of which the more brittle barrier layers are separated from each other by a very robust, somewhat softer material. It is very especially preferred that the separating layer have a softer material than the inner barrier layer and/or outer barrier layer. The term "softer" preferably relates to the Shore hardness D measured at room temperature, and in particular to Standard DIN EN ISO 868:2003-10. The separating layer yields two thinner barrier layers, so that the layered composite consisting of an inner barrier layer, separating layer and outer barrier layer is less brittle as a whole. If the separating layer has PA 6, the separating layer is not only very robust, but also adheres well to the inner barrier layer and the outer barrier layer. As a result, the layered composite consisting of an inner barrier layer, separating layer and outer barrier layer has hardly any tendency to delaminate. The separating layer advantageously abuts against the inner barrier layer and/or against the outer barrier layer. The layer thickness of the separating layer expediently measures at least 0.05 mm or 0.06 mm or 0.08 mm. The layer thickness of the separating layer preferably comes to at most 0.3 mm or 0.4 mm or 0.5 mm. The advantage to larger layer thicknesses for the separating layer tends to be that the barrier layers are separated further away from each other, thereby enabling even stronger bending. Conversely, the thinnest possible layers are advantageous in cases where the tube as light or small in design as possible, which also economizes on the use of material.

It is preferable that the supporting layer have a material that is softer than that of the inner barrier layer. It is advantageous that the supporting layer abut against the inner barrier layer. The supporting layer advantageously comprises a plastic, preferably a polyamide, and in particular PA 6. If the supporting layer comprises a softer material than the inner barrier layer or polyamide, the supporting layer stabilizes the interior side of the inner barrier layer, and thereby in particular reduces the probability that cracks will form on the interior side of the inner barrier layer. If the supporting layer has PA 6, this brings with it the advantages of the polyamide material, along with the advantage of improved adhesion to the interior side of the inner barrier layer, which reduces the probability of delamination while bending. It is possible that the supporting layer be the innermost layer, and preferably have an additive to increase conductivity. For example, the additive can be conductive carbon black. The layer thickness of the supporting layer can measure at least 0.05 mm or 0.06 mm or 0.07 mm. The layer thickness of the supporting layer advantageously comes to at most 0.5 mm or 0.4 mm or 0.3 mm. It is very preferred that the layer thickness of the supporting layer be smaller than the layer thickness of the separating layer. This is because, as opposed to the separating layer, the supporting layer does not have to separate any barrier layers from each other, so that smaller layer thicknesses here basically suffice. The layer thickness of the supporting layer can preferably be at least 5% or 10% or 20% or 30% or 50% smaller than the layer thickness of the separating layer.

According to a preferred embodiment, the first plastic and/or the second plastic is an EVOH, a BVOH or a PVOH, wherein it is preferred that the first plastic and/or the second plastic be an EVOH or a PVOH. These three plastic types are especially preferred, because they each have good barrier properties, are simultaneously easy to process, and as a whole entail comparatively low production costs. Since BVOH can be made significantly softer than EVOH and PVOH, and is simultaneously less advantageous than EVOH and PVOH in terms of production-specific hurdles, the present invention is considered above all for EVOH and PVOH. The vinyl alcohol plastic EVOH is very especially preferred. The barrier property of EVOH is controlled in particular via its ethylene content. The lower the ethylene content, the better the barrier effect, and the more brittle the EVOH. As a consequence, in particular those tubes having a small content of ethylene in the EVOH benefit from the present invention. The ethylene content of the EVOH of the inner and/or the outer barrier layer preferably measures at most 45% or 40% or 36% or 33%. It is preferred that the inner barrier layer and the outer barrier layer have the same material composition. It is possible that the inner barrier layer and the outer barrier layer have different material compositions.

According to a preferred embodiment, the layer thickness of the inner barrier layer is smaller than or equal to (a and preferably smaller than, the layer thickness of the outer barrier layer. Given a consistent added thickness of the two barrier layers, this results in a reduced cracking probability. This is because, during strong bending, the inner barrier layer is exposed to a stronger load than the outer barrier layer, so that the outer barrier layer can be given a somewhat larger layer thickness than the inner barrier layer. It is preferred that the layer thickness of the inner barrier layer be at least 5% or 10% or 15% smaller than the layer thickness of the outer barrier layer. The layer thickness of the inner barrier layer is preferably at most 70% or 60% or 50% smaller than the barrier thickness of the outer barrier layer. The layer thickness of the inner barrier layer can preferably measure at least 0.05 mm or 0.06 mm or 0.08 mm. The layer thickness of the inner barrier layer advantageously comes to at most 0.5 mm or 0.4 mm or 0.3 mm. The layer thickness of the outer barrier layer preferably measures at least 0.06 mm or 0.07 mm or 0.09 mm. The layer thickness of the outer barrier layer preferably comes to at most 0.6 mm or 0.5 mm or 0.4 mm.

The added thickness of the layer thicknesses of the inner barrier layer and the outer barrier layer preferably measures at least 0.11 mm or 0.12 mm or 0.13 mm. It is preferred that the added thicknesses of the layer thicknesses of the inner barrier layer and the outer barrier layer come to at most 1.0 mm or 0.8 mm or 0.6 mm or 0.4 mm. The added thickness of the layer thicknesses of the inner barrier layer and the outer barrier layer expediently measures at least 7% or 14% or 20% of the overall wall thickness of the tube. The added thickness of the layer thicknesses of the inner barrier layer and the outer barrier layer preferably comes to at most 60% or 50% or 40% of the overall wall thickness of the tube. The overall wall thickness of the tube can measure at least 0.5 mm or 0.8 mm or 1.0 mm. The overall wall thickness of the tube advantageously comes to at most 4.0 mm or 3.5 mm or 3.0 mm.

It is possible that the tube have a third barrier layer and a second separating layer, wherein the third barrier layer encloses the outer barrier layer, wherein the second separating layer is arranged between the outer barrier layer and the third barrier layer. It is preferred that the third barrier layer comprise a plastic, wherein the plastic is preferably a vinyl alcohol plastic. The vinyl alcohol plastic of the third barrier layer can be an EVOH, a PVOH or a BVOH, wherein an EVOH or a PVOH is preferred. The plastic of the third barrier layer is especially preferably an EVOH. The EVOH of the third barrier layer has an ethylene content of preferably at least 45% or 40% or 36% or 33%. The third barrier layer expediently has the same material composition as the inner barrier layer and/or the outer barrier layer. The advantage to a third barrier layer lies in the fact that the second separating layer further reduces the danger of cracking given a consistent thickness of the added layer thicknesses of the three barrier layers.

It is preferred that the second separating layer have a plastic, in particular a polyamide, and preferably PA 6. It is advantageous that the material of the second separating layer be softer than that of the outer barrier layer and/or the third barrier layer. This results in a stabilization of the interior side of the third barrier layer as well as of the exterior side of the outer barrier layer. The separating layer has good mechanical properties in the case of polyamide, while these good mechanical properties are also supported by a good adhesion in the case of a PA 6. The second separating layer expediently abuts against the outer barrier layer and/or against the third barrier layer.

The layer thickness of the second separating layer is advantageously smaller than the layer thickness of the boundary layer. It is preferred that the layer thickness of the second separating layer be larger than the layer thickness of the supporting layer. The layer thickness of the separating layer can measure at least 0.05 [m]m or 0.06 mm or 0.07 mm. The layer thickness of the second separating layer advantageously comes to at most 0.5 mm or 0.4 mm or 0.3 mm.

It is preferred that the layer thickness of the third barrier layer be larger than the layer thickness of the first barrier layer and/or the second barrier layer. This is possible, since the third barrier layer is exposed to lower forces than the inner and outer barrier layer while bending the tube. The layer thickness of the third barrier layer can measure at least 0.07 mm or 0.08 mm or 0.1 mm. The layer thickness of the third barrier layer advantageously comes to at most 0.7 mm or 0.6 mm or 0.5 mm.

According to a preferred embodiment, a boundary layer encloses the outer barrier layer or the third barrier layer, wherein the boundary layer preferably abuts against the outer barrier layer or third barrier layer. The boundary layer advantageously has a plastic, preferably a polyamide and/or a thermoplastic elastomer, and especially preferably PA 6, PA 11, PA 12 and/or PA 612. It is preferred that the boundary layer be thicker than the supporting layer and/or thicker than the separating layer. A thick boundary layer is advantageous, since it protects the tube from outside. Aside from chemical loads, this also includes primarily mechanical loads, to which brittle and unprotected barrier layers can react in a sensitive manner. The layer thickness of the boundary layer can measure at least 0.07 mm or 0.08 mm or 0.09 mm. The layer thickness of the boundary layer preferably comes to at most 0.4 mm or 0.3 mm or 0.2 mm. According to an embodiment, the boundary layer comprises only one ply, wherein the only one ply preferably has a plastic, further preferably a polyamide and/or a thermoplastic elastomer, in particular PA 6, PA 11, PA 12 and/or PA 612. The plastic can have an additive, which is used to help the only one ply of the boundary layer to better adhere to the vinyl alcohol plastic. It is very preferred that the material of the only one ply of the boundary layer be softer than the material of the outer barrier layer or a/the third barrier layer. This stabilizes an exterior side of the outer barrier layer or the third barrier layer.

The tube preferably comprises at least one bonding agent ply. According to one embodiment, the boundary layer has the bonding agent ply and a boundary ply, wherein the boundary ply preferably encloses the bonding agent ply. It is advantageous that the outer boundary ply comprise a plastic, preferably a polyamide and/or a thermoplastic elastomer, in particular PA 6, PA 11, PA 12 and/or PA 612. The bonding agent ply is expediently arranged between the outer barrier layer or the third barrier layer and the boundary ply. The bonding layer advantageously abuts against the outer barrier layer or the third barrier layer. The bonding agent ply preferably abuts against the boundary ply. This arrangement makes it possible to also provide other plastics that adhere less well to the vinyl alcohol plastic, so as to reduce the possibility of a delamination. Examples of less well adhering plastics include PA 11, PA 12 or PA 612, which can be arranged on the outer barrier layer or the third barrier layer with the help of a bonding agent, for example comprising a polyolefin and in particular polypropylene or polyethylene.

It is possible that the supporting layer enclose a protective layer, wherein the protective layer preferably forms the innermost layer of the tube. The protective layer preferably comprises a plastic, and in particular can have a fluoropolymer or a polyamide. For example, the fluoropolymer can be an ETFE. The layer thickness of the protective layer can measure at least 0.05 mm or 0.07 mm or 0.09 mm. The layer thickness of the protective layer expediently comes to at most 0.3 mm or 0.25 mm or 0.2 mm.

The innermost layer, in particular the supporting layer or the protective layer, advantageously comprises an additive for increasing conductivity. For example, the additive can be conductive carbon black.

BRIEF DESCRIPTION OF THE DRAWINGS

The present disclosure will be described below on three figures based upon three exemplary embodiments. Shown on FIG. 1 is a cross section of a first tube according to the invention.

DETAILED DESCRIPTION

Figure 1:
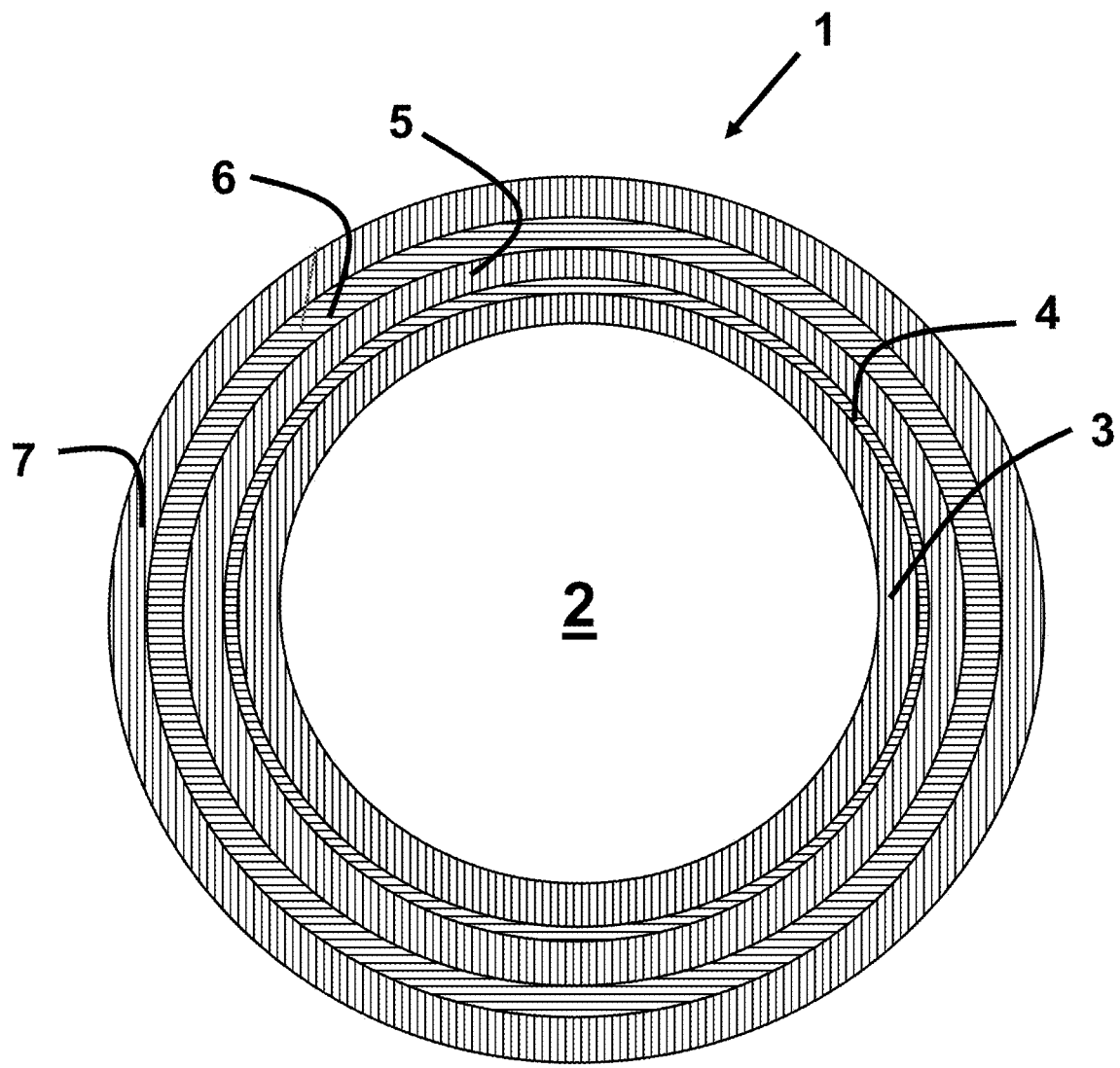

FIG. 1 shows the cross section of a first exemplary embodiment of a tube 1. According to the latter, the tube 1 in this exemplary embodiment comprises a total of five layers (3, 4, 5, 6, 7), which enclose a lumen 2. From the inside out, the tube 1 in this exemplary embodiment comprises a supporting layer 3, an inner barrier layer 4, a separating layer 5, an outer barrier layer 6, as well as a boundary layer 7.

Involved in the case of the inner barrier layer 4 and outer barrier layer 6 are layers that each have a vinyl alcohol plastic. In this exemplary embodiment, both barrier layers have an EVOH, wherein it is preferred that the inner barrier layer 4 and/or the outer barrier layer 6 consist of an EVOH. The ethylene content of the vinyl alcohol plastic of the inner barrier layer 4 and/or the outer barrier layer 6 preferably comes to at most 35 mol. % and further preferably to at most 33 mol. %. According to a special embodiment, the ethylene content of the inner barrier layer 4 and/or the outer barrier layer 6 comes to 32 mol. %. It is preferred that the inner barrier layer 4 and/or the outer barrier layer 6 consist of the vinyl alcohol plastic. The inner barrier layer 4 and the outer barrier layer advantageously consist of the same material. In this exemplary embodiment, the layer thickness of the inner barrier layer 4 measures 0.12 mm, while the layer thickness of the outer barrier layer 6 can measure 0.15 mm, for example.

It is very preferred that the separating layer 5 have a plastic, which preferably involves a polyamide, and especially preferably PA 6. PA 6 adheres well to vinyl alcohol plastics, and in particular to ethylene vinyl alcohol copolymers, so that the separating layer 5 together with the two barrier layers 4, 6 forms a robust layered composite 4, 5, 6. In addition, polyamide or PA 6 is less brittle or tougher than the two barrier layers 4, 6 composed of EVOH, so that the separating layer stabilizes the layered composite 4, 5, 6 from this standpoint as well. The underlying idea of the invention becomes clear from the layered composite 4, 5, 6, since the layered composite 4, 5, 6 permits significantly better bending owing to the separating layer 5 than a continuous barrier layer, whose layer thickness corresponds to 0.27 mm, and hence to the added layer thicknesses of the inner barrier layer 4 and the outer barrier layer 6. The layer thickness of the separating layer 5 can measure 0.1 mm in this exemplary embodiment.

The protective layer 3 preferably comprises a plastic, and preferably consists of a plastic. In particular, the plastic of the supporting layer 3 can comprise a polyamide, preferably PA 6. A typical layer thickness of the supporting layer can be 0.08 mm. In this exemplary embodiment, the supporting layer 3 is the layer which borders the tube 1 to the inside, and hence toward the lumen 2, and consequently also comes into contact with the hydrogen. In this regard, the supporting layer protects the inner barrier layer 4 against washouts, for example. In particular, however, the supporting layer 3 supports the comparatively brittle inner barrier layer 4 on its interior side, so that the inner barrier layer 4 develops fewer cracks during the formation of bends. In addition, the supporting layer 3 protects the inner barrier layer 4 when the tube 1 is pushed onto a quick connector, and there experiences a press fit.

When it forms the innermost layer of the tube 1, the supporting layer 3 advantageously has an additive that increases the conductivity. For example, this additive can be conductive carbon black, which in any event makes the supporting layer 3 as the innermost layer so conductive as to avoid critical electrical charge values.

It is preferred that the tube 1 have a boundary layer 7, which forms the outermost layer of the tube 1 on FIG. 1. In this exemplary embodiment, the boundary layer 7 is arranged directly on the outer barrier layer 6. The boundary layer 7 advantageously consists of a plastic or a polyamide or PA 6. The layer thickness of the boundary layer 7 can come to 0.3 mm.

Figure 2:
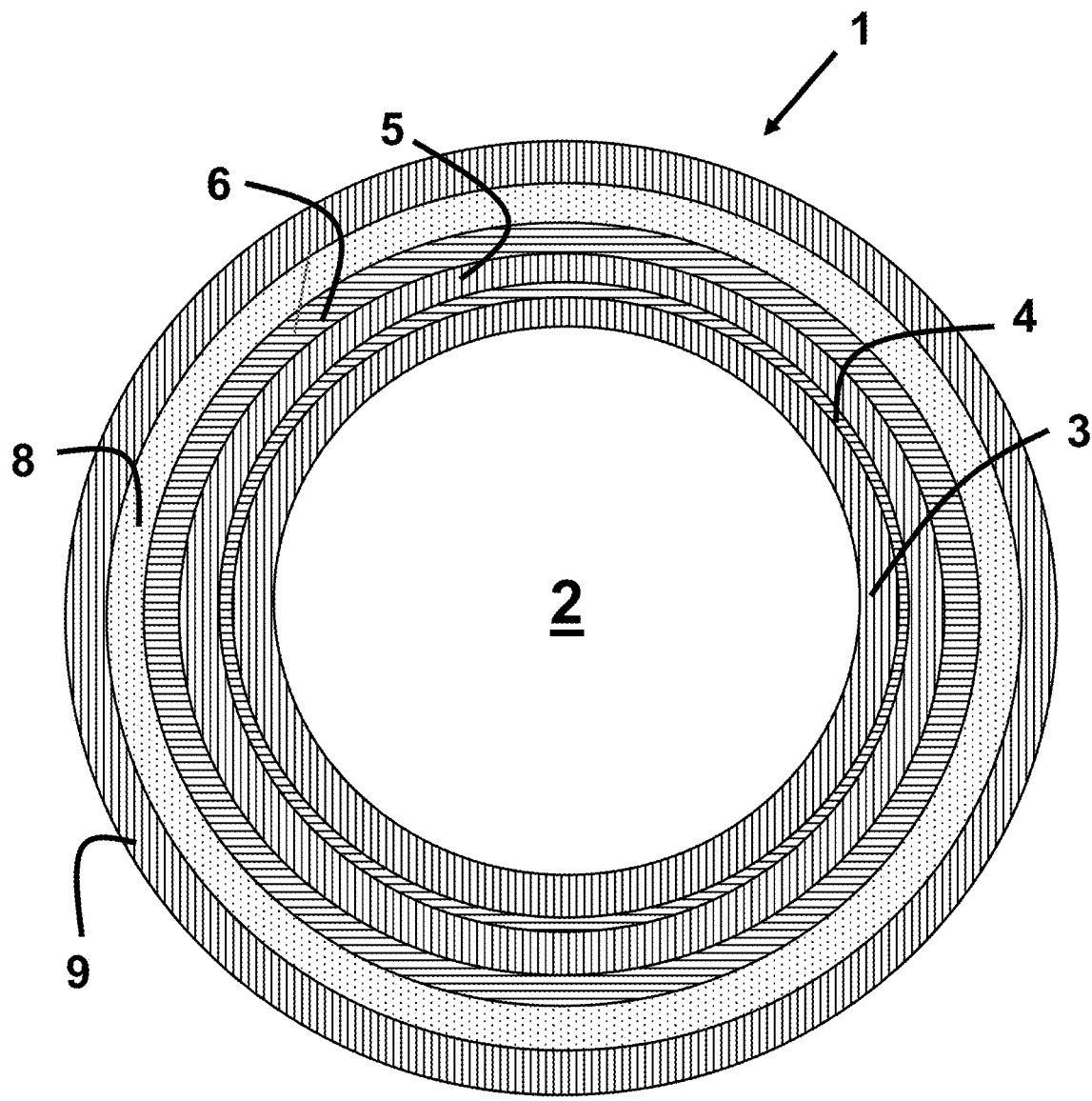
FIG. 2 is a cross section of a second tube according to the invention.

The exemplary embodiment shown on FIG. 2 is a tube 1, which is configured identically to the first exemplary embodiment with respect to layers 3 to 6. As opposed to the first exemplary embodiment, however, the boundary layer was given a two-ply design. The boundary layer 7 in the second exemplary embodiment according to FIG. 2 has a bonding agent ply 8 as well as a boundary ply 9. The boundary ply 9 in this exemplary embodiment preferably consists of a plastic, in particular a polyamide and especially preferably PA 11 or PA 12. Given the poorer adhesion of PA 11 or PA 12 on vinyl alcohol plastics, the bonding agent ply 8 is provided, which can have a polyolefin, in particular polypropylene or polyethylene, for example. However, the bonding agent ply can also comprise an adhesion-modified polyamide or a polyamide 6. In this exemplary embodiment, the layer thickness of the bonding agent ply 8 can measure 0.05 mm. For example, the layer thickness of the boundary ply 9 can come to 0.25 mm.

Figure 3:
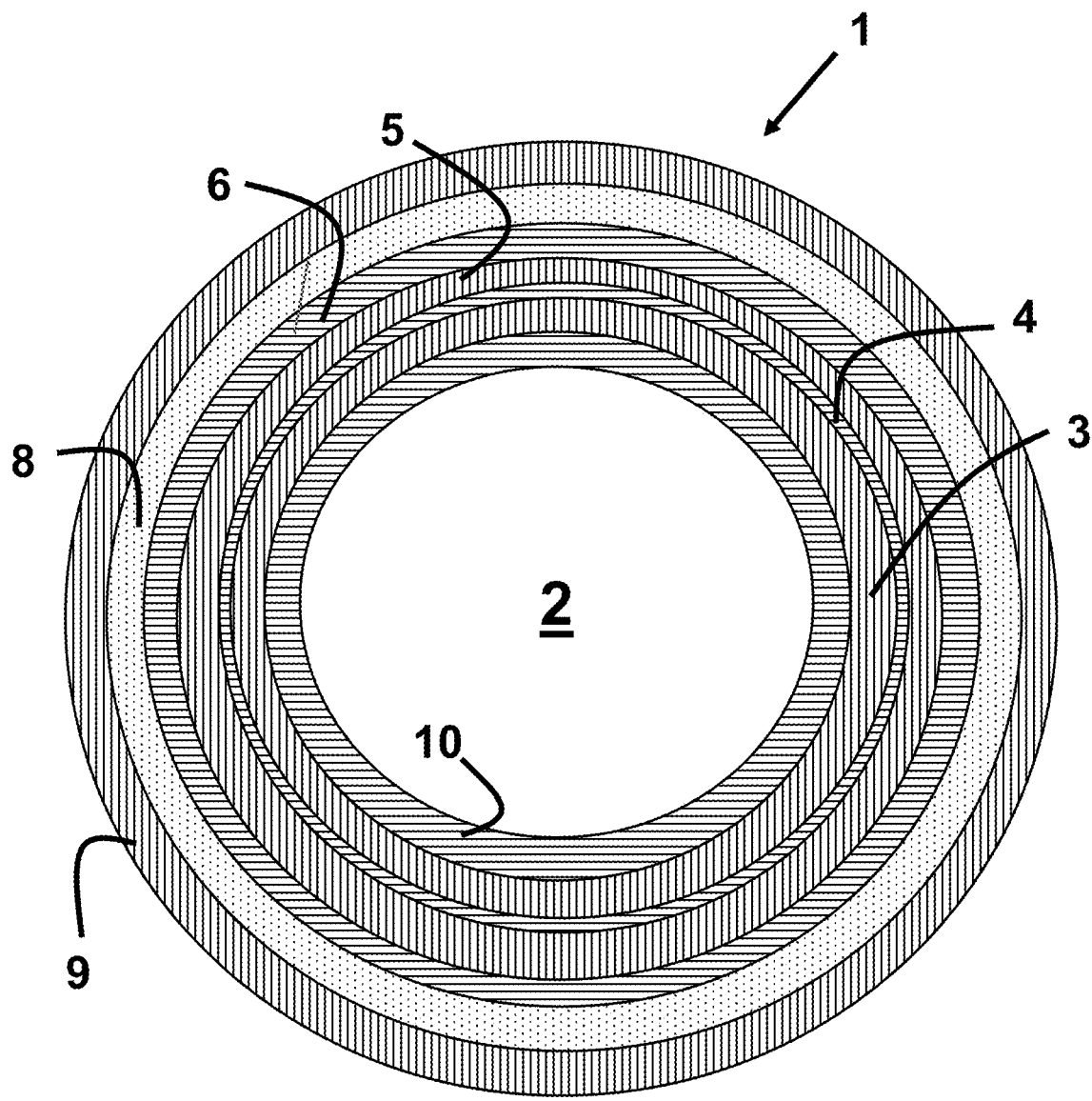
FIG. 3 is a cross section of a third tube according to the invention.

FIG. 3 shows a third exemplary embodiment of a tube 1 according to the invention, which differs from the exemplary embodiment on FIG. 2 primarily in that not the supporting layer 3, but rather a protective layer 10 inwardly adjacent thereto forms the innermost layer of the tube 1. For example, the protective layer 10 can have a polyamide or a fluoropolymer. The fluoropolymer preferably involves an ETFE. The layer thickness of the protective layer 10 can measure 0.15 mm. The protective layer 10 advantageously comprises an additive, so as to increase the conductivity of the protective layer 10. In particular, the additive can involve conductive carbon black.

REFERENCE LIST

1 Tube
2 Lumens
3 Supporting layer
4 Inner barrier layer
5 Separating layer
6 Outer barrier layer
7 Boundary layer
8 Bonding agent ply of 7
9 Boundary ply of 7
10 Protective layer

What is claimed is:

1. A tube for guiding hydrogen, wherein the tube encloses a lumen through which hydrogen is guided, the tube comprising several layers, wherein the tube has least two barrier layers, wherein an inner barrier layer of the at least two barrier layers comprises a first plastic, wherein an outer barrier layer of the at least two barrier layers comprises a second plastic, wherein the first plastic is a vinyl alcohol plastic, the layer thickness of the inner barrier layer being less than the layer thickness of the outer barrier layer, wherein the barrier layers are separated from each other by a separating layer, the separating layer being formed of a softer material than the barrier layers, the separating layer comprising a polyamide, wherein the tube has a supporting layer, wherein the supporting layer is enclosed by the inner barrier layer, wherein the second plastic is a vinyl alcohol plastic.

2. The tube according to claim 1, wherein the supporting layer has a material that is softer than that of the inner barrier layer.

3. The tube according to claim 1, wherein the first plastic and/or the second plastic is an ethylene vinyl alcohol copolymer (EVOH), a butenediol vinyl alcohol copolymer (BVOH) or a polyvinyl alcohol (PVOH).

4. The tube according to claim 1, wherein the added thickness of the layer thicknesses of the inner barrier layer and the outer barrier layer measures at least 0.1 mm.

5. The tube according to claim 1, wherein the tube has a third barrier layer and a second separating layer, wherein the third barrier layer encloses the outer barrier layer, wherein the second separating layer is arranged between the outer barrier layer and the third barrier layer.

6. The tube according to claim 1, wherein a boundary layer encloses the outer barrier layer or the third barrier layer, and is formed of a plastic comprising one or more polyamides.

7. The tube according to claim 6, wherein the tube has at least one bonding agent ply, wherein the boundary layer comprises the bonding agent ply and a boundary ply, wherein the boundary ply comprises a plastic formed of one or more polyamides.

8. The tube according to claim 7, wherein the one or more polyamides of the boundary ply is selected from the group consisting of PA 11, PA 12, PA 612, and a mixture thereof.

9. The tube according to claim 6, wherein the one or more polyamides of the boundary layer is selected from the group consisting of PA 6, PA 11, PA 12, PA 612, and a mixture thereof.

10. The tube according to claim 1, wherein the supporting layer encloses a protective layer, wherein the protective layer forms an innermost layer of the tube, wherein the protective layer has a fluoropolymer.

11. The tube according to claim 10, wherein the innermost layer comprises an additive for increasing the conductivity.

12. The tube according to claim 10, wherein the fluoropolymer of the protective layer is ETFE.

13. The tube according to claim 1, wherein the separating layer comprises polyamide PA 6.

14. The tube according to claim 1, wherein a boundary layer comprises a polyamide.

15. The tube according to claim 14, wherein the boundary layer comprises PA 6, PA 11, PA 12 and/or PA 612.

16. The tube according to claim 1, wherein the supporting layer forms an innermost layer of the tube; wherein the innermost layer comprises an additive for increasing the conductivity.

\* \* \* \* \*